(12) United States Patent
Kuo et al.

(10) Patent No.: US 11,815,889 B2
(45) Date of Patent: Nov. 14, 2023

(54) VEHICLE DRIVING RISK CLASSIFICATION AND PREVENTION SYSTEM AND METHOD

(71) Applicant: XPT (NANJING) E-POWERTRAIN TECHNOLOGY CO., LTD., Nanjing (CN)

(72) Inventors: Bou-Chen Kuo, Taipei (TW); Mu-Jen Huang, Taipei (TW); Ya-Li Tai, Taoyuan (TW); Tianle Chen, Shanghai (CN)

(73) Assignee: XPT (NANJING) E-POWERTRAIN TECHNOLOGY CO., LTD., Nanjing (CN)

( * ) Notice: Subject to any disclaimer, the term of this patent is extended or adjusted under 35 U.S.C. 154(b) by 306 days.

(21) Appl. No.: 16/237,758

(22) Filed: Jan. 2, 2019

(65) Prior Publication Data

US 2019/0204829 A1 Jul. 4, 2019

(30) Foreign Application Priority Data

Jan. 3, 2018 (CN) .......................... 201810005514.4
Jan. 3, 2018 (CN) .......................... 201820008564.3

(51) Int. Cl.
*G05D 1/00* (2006.01)
*B60W 30/095* (2012.01)
*B60W 40/09* (2012.01)

(52) U.S. Cl.
CPC ......... *G05D 1/0061* (2013.01); *B60W 30/095* (2013.01); *B60W 40/09* (2013.01); *G05D 1/0088* (2013.01); *G05D 2201/0213* (2013.01)

(58) Field of Classification Search
CPC ............... G05D 1/0061; G05D 1/0088; G05D 2201/0213; B60W 30/095; B60W 40/09

(Continued)

(56) References Cited

U.S. PATENT DOCUMENTS 9,731,729 B2 8/2017 Solyom et al.
2014/0303827 A1* 10/2014 Dolgov .................. B60W 30/00
701/23

(Continued)

FOREIGN PATENT DOCUMENTS

CN 104428826 3/2015
CN 106164801 11/2016

(Continued)

OTHER PUBLICATIONS

Official Action with machine translation for Taiwan Patent Application No. 107109203, dated Apr. 6, 2022, 15 pages.

(Continued)

*Primary Examiner* — Tyler J Lee
*Assistant Examiner* — Tiffany P Ohman
(74) *Attorney, Agent, or Firm* — Sheridan Ross P.C.

(57) ABSTRACT

A driving risk classification and prevention system for a vehicle being autonomously and manually driven, includes an orientation unit for confirming a location of the vehicle, an exterior sensing unit for sensing first information external to the vehicle, and an autonomous driving risk sensing unit for sensing second information which endanger autonomous driving of the vehicle. A communications unit is linked to the orientation unit for receiving third information corresponding to the location. A risk prevention unit is linked to the orientation unit, the exterior sensing unit, the autonomous driving risk sensing unit, and the communications unit. The risk prevention unit is used for generating a first index according to the first information, generating a second index according to the third information, generating a third index according to the second information, and determining whether a safety operation is performed according to the first index and the second index.

27 Claims, 5 Drawing Sheets

(58) Field of Classification Search
USPC .......................................................... 701/27
See application file for complete search history.

(56) References Cited

U.S. PATENT DOCUMENTS

| | | | |
|---|---|---|---|
| 2016/0207537 A1* | 7/2016 | Urano | B60W 50/16 |
| 2017/0090480 A1* | 3/2017 | Ho | G05D 1/0027 |
| 2017/0234689 A1* | 8/2017 | Gibson | B60W 60/0015 |
| | | | 701/25 |
| 2018/0247538 A1* | 8/2018 | Baek | B60W 30/18154 |

FOREIGN PATENT DOCUMENTS

| | | |
|---|---|---|
| CN | 107207013 | 9/2017 |
| CN | 107499309 | 12/2017 |
| FR | 3041778 | 3/2017 |
| TW | M563380 | 7/2018 |
| WO | WO 2017/017796 | 2/2017 |

OTHER PUBLICATIONS

Official Action for China Patent Application No. 201810005514.4, dated Oct. 10, 2022, 11 pages.

* cited by examiner

VEHICLE DRIVING RISK CLASSIFICATION AND PREVENTION SYSTEM AND METHOD

BACKGROUND OF THE INVENTION

1. Field of the Invention

The application is related to a driving risk classification and prevention system, and more particularly, a system used for an autonomous capable vehicle to perform a safety operation according to a set of indexes.

2. Description of the Prior Art

Traffic accidents are usually caused by factors such as unpleasant weather, narrow and curved roads, driver fatigue, excessive car speed, insufficient distance between cars, etc. When a plurality of factors occur at the same time, the probability of an accident will highly increase.

Typically an alarm system is used, for example, when an abnormal vehicle movement is detected, an alarm signal can be transmitted to remind a driver, however, since a time interval from detecting an abnormal condition to a traffic accident is usually very short, the driver may not have enough time to react. In addition, an sudden alarm signal in an already dangerous traffic situation may cause the driver to panic.

Moreover, even with advanced autonomous driving systems, it is still difficult to avoid traffic accidents. The reason being many environmental factors influence the determination ability of an autonomous driving system. For example, when sunlight is strongly reflected by an obstacle, or when a truck is passing an underpass, the probability for an autonomous driving system to make an incorrect determination will increase when multiple risk factors overlap.

Hence, a solution for detecting driving risks more effectively is still desired.

SUMMARY OF THE INVENTION

An embodiment provides a driving risk classification and prevention system for a vehicle configurable to operate in an autonomous mode and a non-autonomous mode. The system comprising a location determining unit configured to determine a location of the vehicle; at least one sensor configured to sense proximity traffic information; an autonomous driving system; an autonomous driving risk sensing unit configured to sense environmental parameters which endangers autonomous driving of the vehicle; a communications unit configured to transceive information from an external source; and a risk prevention unit comprising at least one processor and data storage comprising instructions executable by the at least one processor to: generate a first index according to the information sensed by the at least one sensor; generate a second index according to the information received by the communications unit; generate a third index according to the information sensed by the autonomous driving risk sensing unit; determine that a safety operation is required according to at least one of the first index, the second index, and the third index; and in response to determining that the safety operation is required, send a safety operation notification to a corresponding system Another embodiment provides an autonomous driving risk sensing system used for a vehicle having an autonomous driving system for a vehicle configurable to operate in an autonomous mode and a non-autonomous mode. The system comprises an autonomous driving risk sensing unit configured to sense information which endangers autonomous driving of the vehicle; an orientation unit configured to confirm a location of the vehicle; an exterior sensing unit configured to sense information external to the vehicle; a communications unit linked to the orientation unit and configured to transceive information corresponding to the location of the vehicle; and a risk prevention unit linked to the orientation unit, the exterior sensing unit, the autonomous driving risk sensing unit and the communications unit, the risk prevention unit comprising at least a processor and a data storage device; wherein the data storage device comprises instructions executable by the at least one processor so that the risk prevention unit is configured to generate a first index according to the information sensed by the exterior sensing unit, generate a second index according to the information received by the communications unit, generate a third index according to the information sensed by the autonomous driving risk sensing unit, determine whether to perform a safety operation according to the first index, the second index and the third index, and send a safety operation notification to a corresponding system in response to determining that the safety operation is required.

Another embodiment provides a driving risk classification and prevention method for a vehicle configurable to operate in an autonomous mode or a non-autonomous mode. The method comprises sensing information external to the vehicle; generating a first index according to the information external to the vehicle; confirming a location of the vehicle; receiving information corresponding to the location; generating a second index according to the information corresponding to the location; receiving a set of factors which endangers autonomous driving of the vehicle; generating a third index according to the set of factors which endangers the autonomous driving of the vehicle; determining whether to perform a safety operation according to at least the first index and the second index; and sending a safety operation notification to a corresponding system in response to determining that the safety operation is required.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
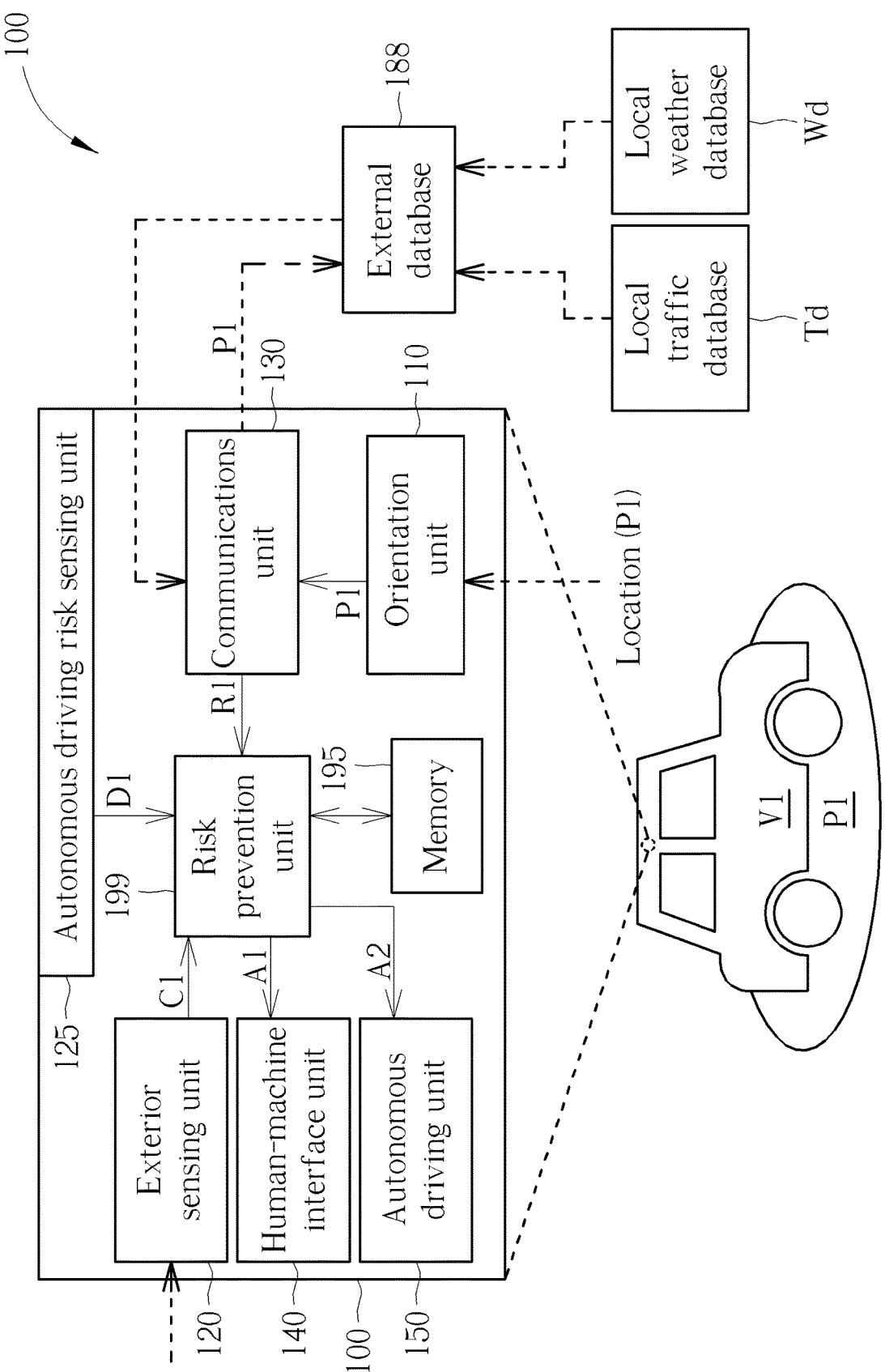
FIG. 1 illustrates a driving risk classification and prevention system for a vehicle being autonomously and manually driven according to an embodiment.

FIG. 1 illustrates a driving risk classification and prevention system 100 for a vehicle V1 configurable to operate in an autonomous mode or a non-autonomous mode. In the autonomous mode, the vehicle V1 may operate autonomously, and in the non-autonomous mode, the vehicle V1 may be operated by a user. The driving risk classification and prevention system 100 may be used for the vehicle V1 and includes an orientation unit 110, an exterior sensing unit 120, an autonomous driving risk sensing unit 125, a communications unit 130 and a risk prevention unit 199. The foresaid units may be linked to one another. The vehicle V1 may be a car, truck, bus, motorcycle or another vehicle for carrying passengers. When the vehicle V1 is autonomously driven, an autonomous driving unit 150 shown in FIG. 1 may be used to autonomously drive the vehicle V1 without a driver by performing operations such as speeding up the vehicle V1, braking the vehicle V1 or changing the direction of the vehicle V1. When the vehicle V1 is manually driven, the vehicle V1 is driven by a driver.

The orientation unit 110 may be used to confirm a location P1 of the vehicle V1. The location P1 may be expressed by a pair of a latitude and a longitude or a set of geometrical coordinates positioned by the global positioning system (GPS). The location P1 may be defined by other positioning systems such as other geocoding systems. The location P1 may be corresponding to a conventional address or a highway location marker.

The exterior sensing unit 120 may be used to sense information C1 external to the vehicle V1. The information C1 may include car speed information, information of relative positions of the vehicle V1 and at least one external object, and/or information of relative speeds of the vehicle V1 and the at least one external object. For example, the vehicle V1 is a car moving on a highway at a high speed, the exterior sensing unit 120 may use image capturing, Doppler effect sensing or laser light scanning sensing to obtain parameters such as relative distances, positions and speeds of the vehicle V1 and other vehicles, and the changes of the parameters. The information obtained by the exterior sensing unit 120 may be the information C1. Hence, the exterior sensing unit 120 may include an image capturing unit (for capturing image information of an external object), a LiDAR (Light Detection And Ranging) unit and/or a radar unit. The motion status of the vehicle V1 such as motion in horizontal or forward-backward directions or motion corresponding to time may be a portion of the information C1.

The autonomous driving risk sensing unit 125 may be used to sense information D1 which endangers autonomous driving of the vehicle V1. The information D1 may include a sunlight factor, a sunlight reflection factor, a fog factor, a rain factor, an atmospheric particulate matter factor and/or an insufficient lighting factor. The autonomous driving risk sensing unit 125 may also receive information of a factor which interferes the autonomous driving of the vehicle V1 through the exterior sensing unit 120 or the communications unit 130.

The communications unit 130 may be directly or indirectly coupled to the orientation unit 110 through a wire or wirelessly to transceive information R1 related to the location P1. For example, the communications unit 130 may directly receive the information of the location P1 from the orientation unit 110. However, according to another embodiment, the orientation unit 110 may inform the risk prevention unit 199 of the location P1, and then the communications unit 130 may receive the information of the location P1. The communications unit 130 may be linked to an external database 188 to obtain the information R1 from the external database 188 through wireless communications such as 3G, 4G, 5G or satellite communications. As shown in FIG. 1, the external database 188 may be linked to a local weather database Wd or a local traffic database Td to obtain real-time or long-term data about weather or traffic. Hence, the information R1 may include average car speed information, traffic flow information, road width information, road curvature information, road historic accident rate information, and/or weather information of the location P1. The weather status and the traffic status of the location P1 may be acknowledged. The information R1 may include real-time information (e.g. current traffic conditions) and information of long-term statistics (e.g. a traffic accident rate or probability of precipitation of the location according to historic data). The local weather database Wd and the local traffic database Td may be commercial databases or open databases of government.

The risk prevention unit 199 may be linked to the orientation unit 110, the exterior sensing unit 120, the autonomous driving risk sensing unit 125 and the communications unit 130 through wires and/or wirelessly. The risk prevention unit 199 may generate a first index Pt1 according to the information C1, generate a second index Pt2 according to the information R1, generate a third index Pt3 according to the information D1, and determine whether to perform a safety operation according to at least the first index Pt1 and the second index Pt2. When the vehicle V1 is under the autonomous driving, it may be determined whether to perform the safety operation according to the first index Pt1, the second index Pt2 and the third index Pt3. The risk prevention unit 199 may determine whether to perform the safety operation according to the indexes Pt1, Pt2 and Pt3 using preset algorithms, a decision engine or functional calculations. A remote command may be received through a communications system for determination of the safety operation. When the risk prevention unit 199 determines the safety operation is required, the risk prevention unit 199 may send a safety operation notification to a corresponding system for performing the safety operation.

Table 1 describes the information used by the risk prevention unit 199 and the corresponding indexes.

TABLE 1

| Information | Corresponding index |
| --- | --- |
| Information C1 | First index Pt1 |
| Information R1 | Second index Pt2 |
| Information D1 | Third index Pt3 |

The foresaid indexes Pt1, Pt2 and Pt3 may sequentially correspond to influences of driving risk corresponding to the information C1, R1 and D1.

According to an embodiment, the safety operation may be initiating the autonomous driving, and the corresponding system may be an autonomous driving system such as the autonomous driving unit 150 shown in FIG. 1.

According to an embodiment, the safety operation may be switching the vehicle V1 to be the non-autonomous mode and the corresponding system may be the autonomous driving system.

According to an embodiment, the safety operation may be avoiding initiating the autonomous driving when a driver intends to initiate the autonomous driving of the vehicle V1, and the corresponding system may be the autonomous driving system.

According to an embodiment, the communications unit 130 may be further used to send driving information of the vehicle V1 to an external system external to the vehicle. The safety operation may be sending the driving information to the external system, and the corresponding system may be the communications unit 130.

According to embodiments, different algorithms may be used for different locations. For example, different algorithms may be used in different regions or countries. For example, in a region where small motorcycles or scooters are used as major transportation or in a densely populated city, the algorithm used for a proximity sensor of the system 100 may be adjusted. According to embodiments, the used algorithms may be updated over time. For example, the updates of the algorithms may be regular or irregular.

For example, when the first index Pt1 corresponds to a higher risk, the information C1 may correspond to a higher speed of the vehicle V1, a larger number of objects around the vehicle V1, a higher risk level of a near vehicle (e.g. a truck) and/or a smaller distance between the vehicle V1 and another vehicle. When the first index Pt1 corresponds to a lower risk, the information C1 may correspond to a lower speed of the vehicle V1, a smaller number of objects around the vehicle V1, a lower risk level of a near vehicle and/or a larger distance between the vehicle V1 and another vehicle.

When the second index Pt2 corresponds to a higher risk, the information R1 may correspond to a higher historic accident rate of a road section of the location P1, a heavy rain warning, a fog warning, a sharp turn ahead warning, a dangerous descent warning, a larger variance of the road width, and/or other risky accidents at the location P1. When the second index Pt2 corresponds to a lower risk, the road section of the location P1 may correspond to a lower historic accident rate, a weather condition which less interferes the driving, lower complexity of a road condition, a wider road width, and smooth road conditions.

When the third index Pt3 corresponds to a higher risk, the information D1 may indicate that an autonomous driving sensor of the system 100 may be interfered by a sunlight intensity, a sunlight angle, a fog factor, a rain factor, an atmospheric particulate matter factor, an insufficient lighting factor, and/or a factor which interferes the autonomous driving of the vehicle V1. For example, a truck having a highly reflective surface may be a risky object inducing the third index Pt3 of a higher risk. When the third index Pt3 corresponds to a lower risk, the information D1 may indicate that autonomous driving sensor of the system 100 may be less interfered by environmental factors or objects near the vehicle V1.

The foresaid indexed Pt1, Pt2 and Pt3 may be represented as matrixes. For example, if the index Pt1 corresponds to three parameters, the index Pt1 may be expressed as Pt1=[100, 80, 90]. As for calculations of the indexes, it will be described below.

The risk prevention unit 199 may determine whether to perform the safety operation according to the indexes Pt1, Pt2 and Pt3, and the safety operation may be performed for the vehicle V1.

According to an embodiment, the index Pt1 may be related to parameters Sp, oSp1, oSp2 and Ld. The parameter Sp may be a speed of the vehicle V1. The parameter oSp1 may be generated by multiplying a first vehicle type weight by a relative speed of a first vehicle closest to the vehicle V1. The parameter oSp2 may be generated by multiplying a second vehicle type weight by a relative speed of a second vehicle secondarily closest to the vehicle V1. The parameter Ld1 may be generated by multiplying an object type weight by a distance between the vehicle V1 and a non-vehicle object.

In addition, the index Pt2 may be related to parameters Wr, Rd and Hy. The parameter Wr may be generated by multiplying a weather condition base by a night weight. The parameter Rd may be generated by multiplying a road type base by a curvature weight and further by a slope weight. The parameter Hy may be generated by multiplying an average car speed by a historic accident rate weight.

In addition, the index Pt3 may be related to parameters Sn, Aw and Ao. The parameter Sn may be corresponding to a sunlight intensity. The parameter Aw may be a light transmission parameter generated by multiplying the parameter Wr with an air transmittance. The parameter Ao may be generated by regarding a road type base, a proximate vehicle type weight and a proximate non-vehicle object type weight.

The risk prevention unit 199 may control the vehicle V1 to perform a safety operation such as switching the vehicle V1 from the non-autonomous mode to the autonomous mode, switching the vehicle V1 from the autonomous mode to the non-autonomous mode, avoiding switching the vehicle V1 from the non-autonomous mode to the autonomous mode, reducing speed, limiting speed, changing a parameter of a sensor, disabling a sensor, enabling a sensor and/or sending driving out information outward using the communications unit 130.

For example, when a vehicle operates in the non-autonomous mode at a 80 kilometer/hour speed in heavy rain, and a zero slope intersection is in front, the parameter Sp related to the index Pt1 may be 80, and the parameter Wr related to the index Pt2 may be obtained by multiplying 50 (a base for heavy rain) by 2.5 (a night weight). The parameter Rd may be obtained by multiplying 70 (a base for intersection) by 1 (a slope weight). According to the indexes Pt1, Pt2 and Pt3, a safety operation of higher priority may be unnecessary. For example, it is not needed to initiate the autonomous driving or brake the vehicle. Under this condition, the risk prevention unit 199 may send a speed reduction notification to reduce the speed of the vehicle V1 to 50 kilometer/hour till the vehicle V1 passes the intersection.

According to embodiments, when a safety operation of higher priority is necessary according to the indexes Pt1, Pt2 and Pt3, the safety operation such as initiating the autonomous driving or braking the vehicle V1 may be performed. For example, when an abnormal motion track is detected or the driver is detected to be comatose, a safety operation of higher priority is necessary.

According to embodiments, when the vehicle V1 is being autonomous driven, if the non-autonomous mode is determined to be necessary according to the indexes Pt1, Pt2 and Pt3, the vehicle V1 may be switched to the non-autonomous mode. For example, when excessive sunlight or reflected light is detected, the risk prevention unit 199 may determine it is too dangerous to autonomously drive the vehicle V1. Likewise, when the vehicle V1 operates in the non-autonomous mode, if the non-autonomous mode is determined to be still necessary according to the indexes Pt1, Pt2 and Pt3, the safety operation may be avoiding initiating the autonomous driving.

According to embodiments, the safety operation performed according to the indexes Pt1, Pt2 and Pt3 may be sending driving information of the vehicle V1 to an external system external to the vehicle V1. For example, the external system may be of another vehicle on the same road section, and the two vehicles may sense one another to prevent a traffic accident.

According to embodiments, the safety operation performed according to the indexes Pt1, Pt2 and Pt3 may be disabling or enabling at least one sensor of at least one of the exterior sensing unit 120 and the autonomous driving risk sensing unit 125, and/or adjusting sensitivity, a sensing distance and/or a sensing frequency of the at least one sensor. For example, when the vehicle V1 is detected to be driven in heavy fog according to the index Pt3, sensitivity, a sensing distance and a sensing frequency of a proximity sensor may be adjusted to be more sensitive for improving safety.

The scenarios described above are merely provided as examples instead of limitations of embodiments of the application.

The abovementioned parameters may be calculated as expressed by the equation eq-1:

$$f(X,Y,Z\ldots) = \text{parameter} \quad (\text{eq-1});$$

where f( ) may be a function, and variables X, Y, Z . . . may be variables and weights considered when calculating the parameter. For example, when calculating the foresaid parameter oSp1, a speed of a proximate vehicle and a vehicle type weight related to the proximate vehicle may be regarded. If the proximate vehicle is a truck, the vehicle type weight related to the proximate vehicle may be larger. In addition, other variables may be used to calculate a parameter. For example, the parameter Aw (i.e. a light transmission parameter) may be generated by multiplying the parameter Wr (i.e. a weather parameter) by an air transmittance. In other words, different parameters may be influenced by one another. The function f( ) may substantially be used for weighted sum calculation or another appropriate calculation such as a statistical derivation or regression analysis to obtain a reasonable parameter.

The abovementioned methods may be performed by the risk prevention unit 199. The hardware of the risk prevention unit 199 may have calculation and determination functions. The risk prevention unit 199 may include programmable programs to perform calculations. For example, the risk prevention unit 199 may include a central processing unit (CPU), a system-on-a-chip (SoC) or an application-specific integrated circuit (ASIC).

The hardware of the orientation unit 110 may include a global positioning system (GPS) receiver. The hardware of the communications unit 130 may include a wireless communications receiver. The used algorithms may be received and updated through the communications unit 130.

The hardware of the exterior sensing unit 120 may include a sensor using Doppler effect such as a camera sensor, a LiDAR sensor or a radar sensor, or a sensor used to sense an external status such as a proximity sensor. The autonomous driving risk sensing unit 125 may include a sensor for sensing a sunlight intensity, a reflected sunlight intensity, a fog degree, a rain degree, an atmospheric particulate matter degree and/or an insufficient lighting degree. The autonomous driving risk sensing unit 125 may receive information which interferes the autonomous driving through the exterior sensing unit 120 and/or the communications unit 130. The abovementioned received and sensed data may be converted to an index according to the degree of a factor or whether an interference event is detected. The exterior sensing unit 120, the autonomous driving risk sensing unit 125, and the communications unit 130 may be used to convert sensed data to an index. In another embodiment, the risk prevention unit 199 may receive data and then convert the data to an index. The way of converting sensed and received data to an index may be designed regarding hardware configuration and software design structure. Sensitivity, a sensing distance and/or a sensing frequency of at least one sensor of the exterior sensing unit 120 and/or autonomous driving risk sensing unit 125 may be adjustable.

According to an embodiment, for example, when the vehicle V1 is operated in the non-autonomous mode at a high speed on a highway with less traffic, the orientation unit 110 may confirm the location (e.g. a road section of the highway), the communications unit 130 may receive traffic information of the location (e.g. information of low traffic), the exterior sensing unit 120 may confirm motion information of other vehicles near the vehicle V1, and the risk prevention unit 199 may perform a safety operation according to foresaid indexes Pt1, Pt2 and Pt3 to adjust sensors of the exterior sensing unit 120. A long distance sensor of the exterior sensing unit 120 may be set more sensitive, and a short distance sensor of the exterior sensing unit 120 may be set to a low power consumption mode.

According to an embodiment, the driving risk classification and prevention system 100 may optionally include an external memory 195 coupled to the risk prevention unit 199 for storing data received and/or generated by the risk prevention unit 199. The external memory 195 may optionally include a flash memory, a random-access memory, or a synchronous dynamic random-access memory.

According to embodiments, different algorithms may be used for different locations. For example, different algorithms may be used in different regions or countries. For example, in a region where small motorcycles or scooters are used as major transportation or in a densely populated city, the algorithm used for a proximity sensor of the system 100 may be adjusted. According to embodiments, the used algorithms may be updated over time. For example, the updates of the algorithms may be regular or irregular.

The foresaid safety operation may include warning a driver or performing the autonomous driving of the vehicle V1.

Hence, when the information C1 or the information R1 corresponds to an excessive risk, the driving risk classification and prevention system 100 may perform a corresponding safety operation in advance instead of performing a safety operation when the vehicle has been in an abnormal motion track. It may effectively prevent the shortcoming of not sending warnings until on a verge of an accident, so the driving safety may be effectively improved.

Figure 2:
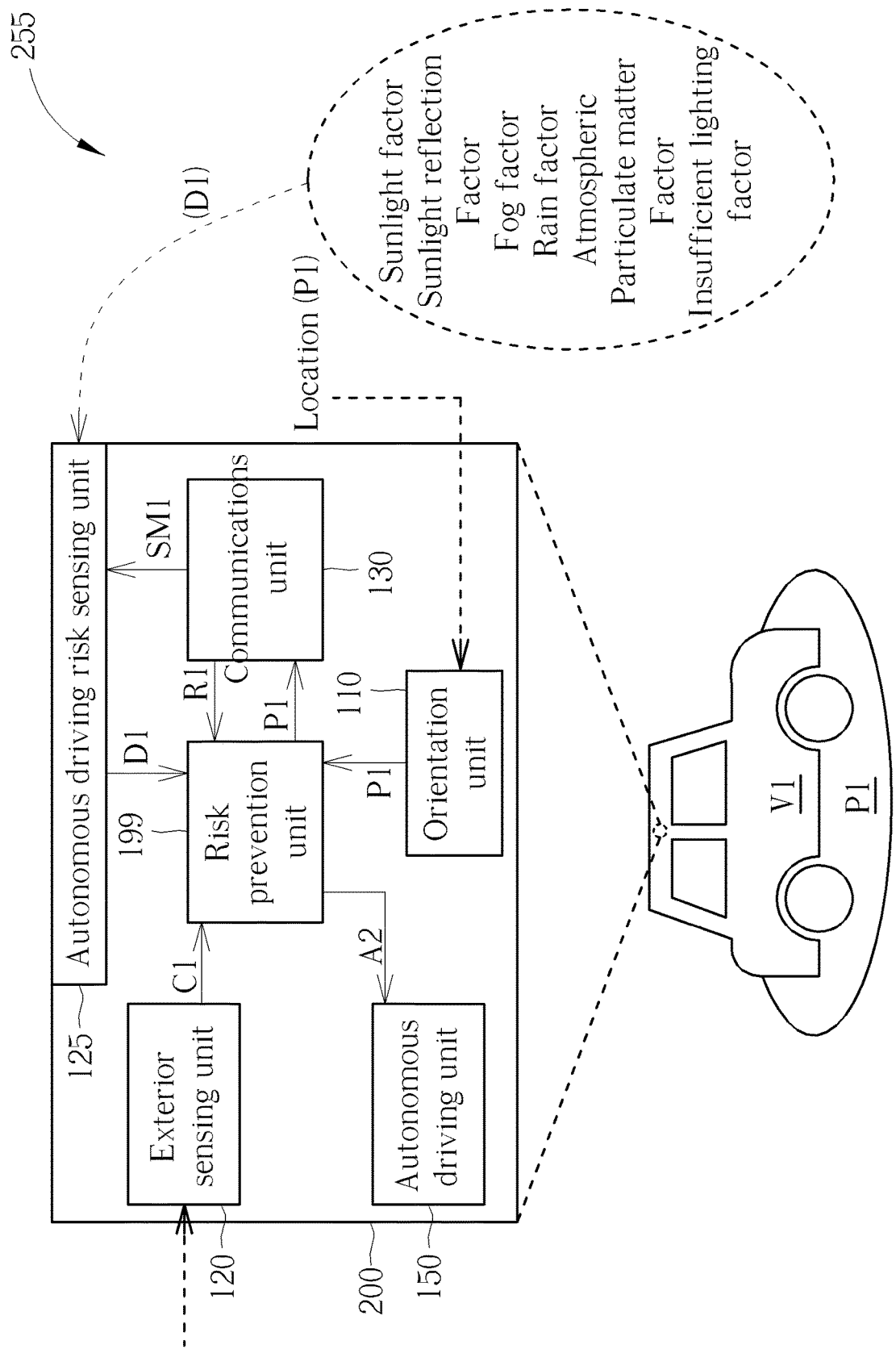
FIG. 2 illustrates an autonomous driving risk sensing system according to another embodiment.

FIG. 2 illustrates an autonomous driving risk sensing system 255 according to an embodiment. Similarities between FIG. 1 and FIG. 2 are not repeatedly described. The autonomous driving risk sensing system 255 in FIG. 2 may operate when the vehicle V1 is autonomously driven by the autonomous driving unit 150 or when it is intended to initiate the autonomous driving. The information D1 sensed by the autonomous driving risk sensing unit 125 may correspond to a factor which interferes the autonomous driving such as a sunlight factor, a sunlight reflection factor, a fog factor, a rain factor, an insufficient lighting factor, an atmospheric particulate matter factor, and so on. The autonomous driving risk sensing unit 125 may include a light brightness sensor to monitor light external to the vehicle V1 or the influence on image determination ability of a camera of the exterior sensing unit 120, wherein the influence is caused by light or sunlight external to the vehicle V1. In FIG. 2, the autonomous driving risk sensing unit 125 may sense the information D1 related to interferences to the autonomous driving caused by the atmospheric particulate matter. The autonomous driving risk sensing unit 125 may determine the information D1 according to the location P1 of the vehicle V1 and atmospheric particulate matter information SM1 where the information D1 may correspond to factors endangering the autonomous driving. When at least one of the abovementioned endangering factors makes the risk prevention unit 199 determine that the autonomous driving will be interfered according to the information D1 sensed by the autonomous driving risk sensing unit 125, a corresponding safety operation may be performed. The safety operation may heighten sensitivity of a sensor, turn on more sensors, reduce speed or avoid initiating the autonomous driving. Hence, the risks possibly happening under the autonomous driving may be classified and prevented.

Figure 3:
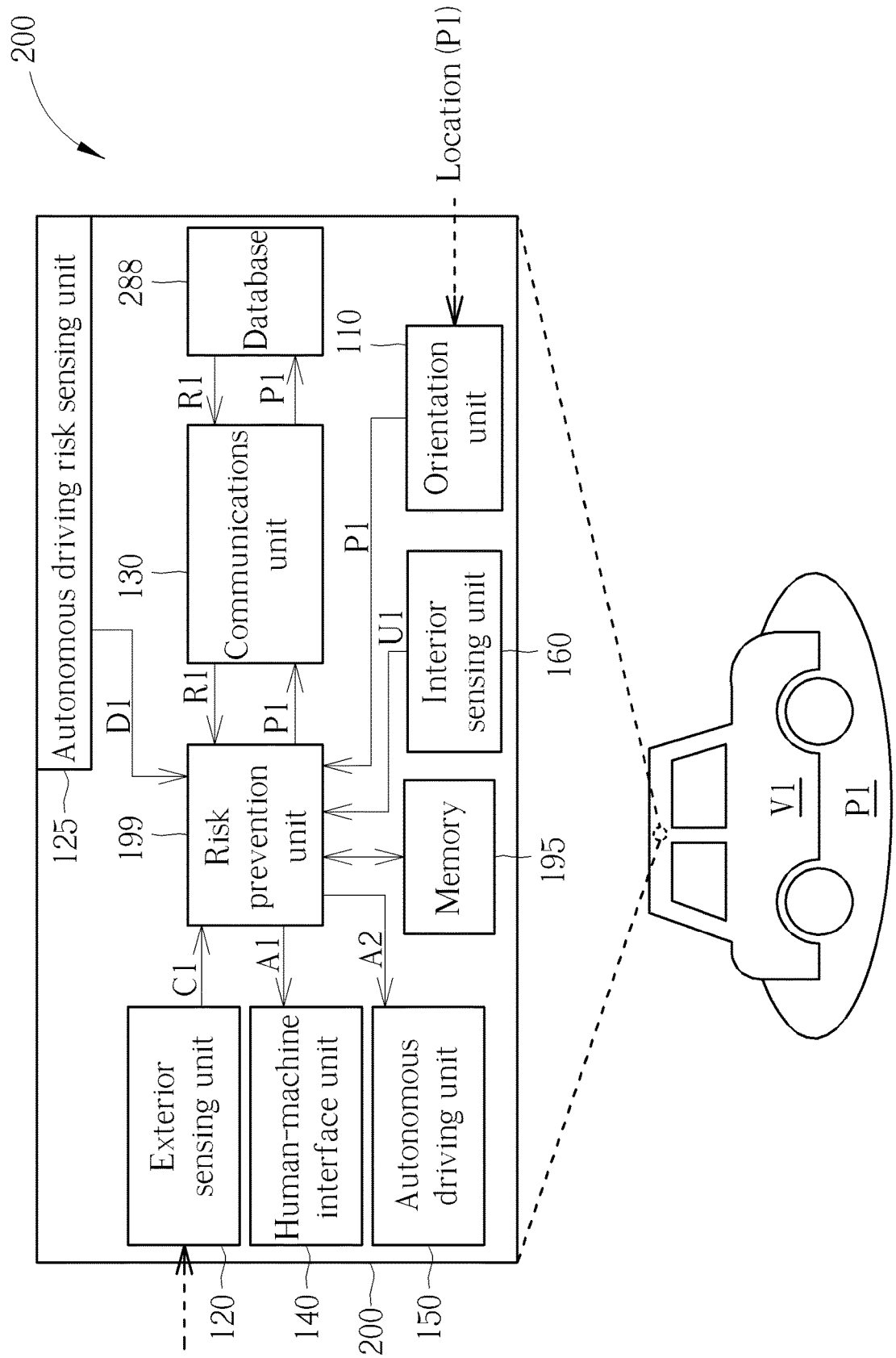
FIG. 3 illustrates a driving risk classification and prevention system according to another embodiment.

FIG. 3 illustrates a driving risk classification and prevention system 200 according to an embodiment. The similarities between the driving risk classification and prevention systems 200 and 100 are not repeatedly described. In the driving risk classification and prevention system 200, a database 288 may be further included and coupled to the risk prevention unit 199. The orientation unit 110 may be linked to the risk prevention unit 199 to send the location P1 to the risk prevention unit 199, then the location P1 is sent to the database 288 via the risk prevention unit 199. Unlike the external database 188 of FIG. 1, the database 288 of FIG. 2 may be embedded in the system 200 and store information corresponding to the location P1 in advance. Hence, when the database 288 receives the location P1, the database 288 may be searched to have the information R1 corresponding to the location P1 and send the information R1 back to the risk prevention unit 199. For example, a driver may use a navigation system to generate a planned route, download information of road sections along the planned route, and store the information of the road sections to the database 288 for the risk prevention unit 199 to use.

According to embodiments, the abovementioned external database 188 may be a database of another vehicle or a database built near a road. For example, when a fleet including a plurality of vehicles moves in a desert, a peer-to-peer network may be formed among the vehicles. The communications unit 130 of a first vehicle may receive information from the communications unit 130 of a second vehicle, and the database of the second vehicle may be the external database 188 for the first vehicle.

According to embodiments, as shown in FIG. 3, the driving risk classification and prevention system 200 may optionally include an interior sensing unit 160 for obtaining information U1 sensed from the interior of the vehicle V1. The information U1 may include a driver status of a driver (e.g. a physiological status or a head motion status), information from a wearable device of the driver (e.g. a heartbeat rate or a pulse rate) and/or spatial information in the vehicle (e.g. a temperature or a humidity). The interior sensing unit 160 may include an eyeball sensor, a heartbeat sensor, a breath sensor, a wearable sensor and/or a head motion sensor. The information U1 may include eyeball information, heartbeat information, breath information and/or head motion information. The wearable sensor of the interior sensing unit 160 may be embedded in a wireless communications bracelet or necklace, used to communicate with the vehicle V1, and not a portion of the vehicle V1. The risk prevention unit 199 may be further linked to the interior sensing unit 160 to generate a fourth index Pt4 according to the information U1. Table 2 describes the information used by the risk prevention unit 199 and the corresponding indexes.

TABLE 2

| Information | Corresponding index |
|---|---|
| Information C1 | First index Pt1 |
| Information R1 | Second index Pt2 |
| Information D1 | Third index Pt3 |
| Information U1 | Fourth index Pt4 |

Since fatigue and physical discomfort of drivers have been major causes of traffic accidents, the interior sensing unit 160 may be used to monitor physical status of a driver for estimating risk. For example, on a road section with a higher risk, a driver needs to pay more attention for safety. If the system merely considers the status of a driver, the accuracy of detection may be insufficient. Results of false positive or false negative may be generated. In other words, an unnecessary safety operation may be performed, or a necessary safety operation may be performed. By comprehensively analyzing the first index Pt1, the second index Pt2, the third index Pt3 and the fourth index Pt4 shown in Table 2, results of false positive or false negative caused by merely detecting the status of a driver may be reduced. According to embodiments, the fourth index Pt4 may be generated according to the union or the intersection of multiple sets of physical conditions. The index Pt4 may be generated according to a score accumulated according physical conditions of a driver. For example, it may be determined that driver fatigue occurs when merely detecting a driver's head shakes abnormally, and the index Pt4 is generated accordingly. In another example, it may be determined that driver fatigue occurs when detecting a driver's head shakes abnormally and the driver's eyeball also moves abnormally, and the index Pt4 is generated accordingly. The index Pt4 may be obtained according to a degree of the change of a physical status of a driver.

According to embodiments, a plurality of indexes of the first index Pt1, the second index Pt2, the third index Pt3 and the fourth index Pt4 may be influenced by one another. For example, if the speed of the vehicle V1 is 100 kilometer/hour, the information C1 may make the first index Pt1 to be 100. However, if the reflection of sunlight is excessive, the information D1 may heighten the third index Pt3, the third index Pt3 may influence the first index Pt1 to make the first index Pt1 become 300. Hence, the first index Pt1, the second index Pt2, the third index Pt3 and the fourth index Pt4 may dynamically influence one another. For example, the abovementioned parameter Ao corresponding to the third index Pt3 may be generated by referring to the abovementioned parameter Rd corresponding to the third index Pt2 to improve the accuracy of risk detection.

Figure 4:
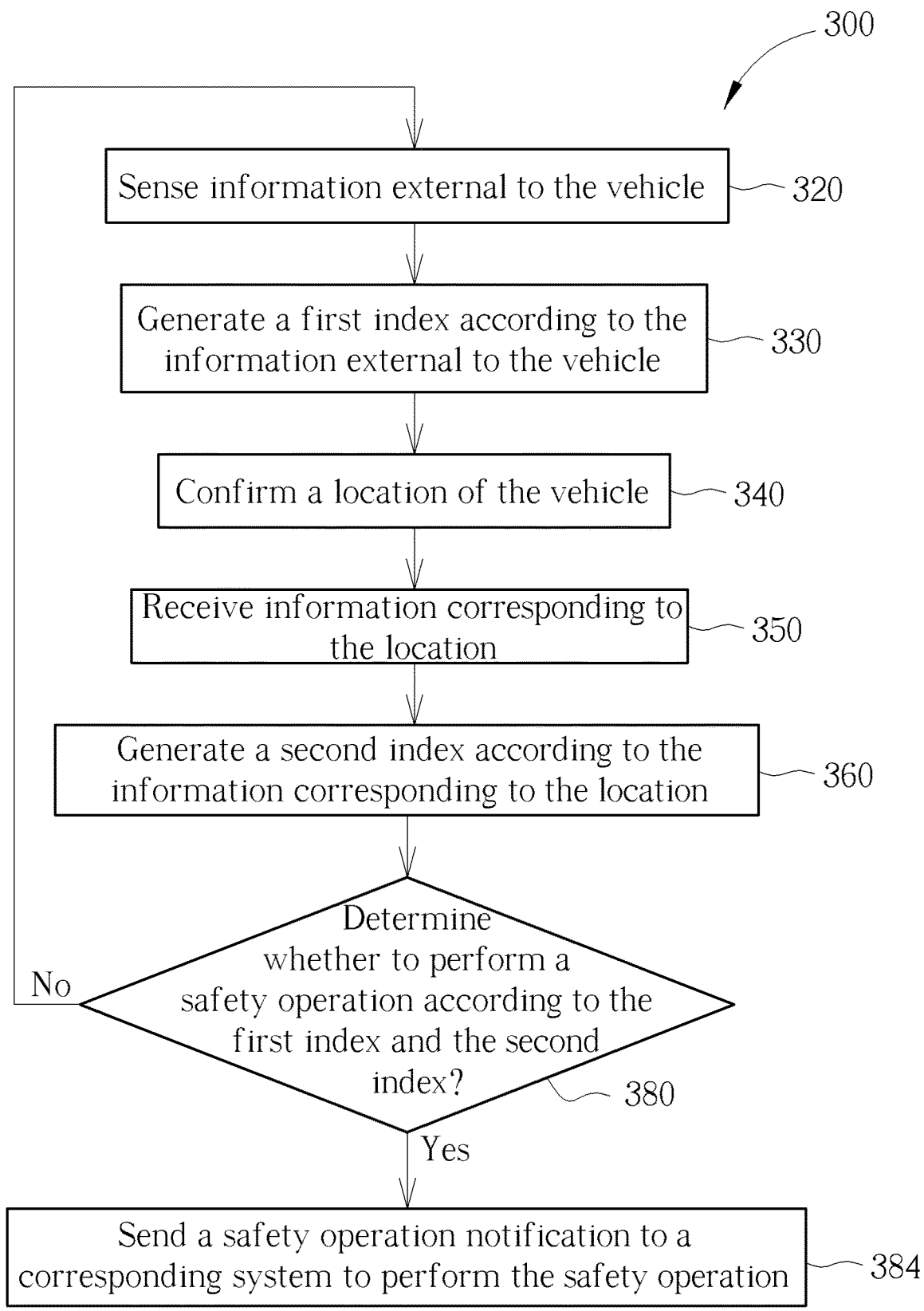
FIG. 4 illustrates a flowchart of a driving risk classification and prevention method according to an embodiment.

FIG. 4 illustrates a flowchart of a driving risk classification and prevention method 300 according to an embodiment. The method 300 may include following steps.

Step 320: sense information C1 external to the vehicle V1;

Step 330: generate a first index Pt1 according to the information C1 external to the vehicle V1;

Step 340: confirm a location P1 of the vehicle V1;

Step 350: receive information R1 corresponding to the location P1;

Step 360: generate a second index Pt2 according to the information R1 corresponding to the location P1;

Step 380: determine whether to perform a safety operation according to the first index Pt1 and the second index Pt2; if so, enter Step 384; else enter Step 320; and Step 384: send a safety operation notification to a corresponding system to perform the safety operation.

The safety operation may include adjusting sensitivity of a sensor, reducing speed of the vehicle V1 and/or a more active interfering operation such as autonomous driving the vehicle V1. According to embodiments, Steps 320 to 330 may be optionally replaced with Steps 340 to 360. For example, Steps 340 to 360 may be performed first to obtain the second index Pt2 first, and then Steps 320 to 330 may be performed to obtain the first index Pt1. In another example, Steps 320 to 330 may be performed synchronously with Steps 340 to 360 to synchronously obtain the indexes Pt1 and Pt2 substantially. Although steps in FIG. 4 are sequentially arranged, a plurality of steps of Steps 320 to 384 may be synchronously performed or be combined to reduce the number of steps. The order of the steps may be adjusted. Reasonable adjustments of the steps may be still within the scope of the embodiment.

Figure 5:
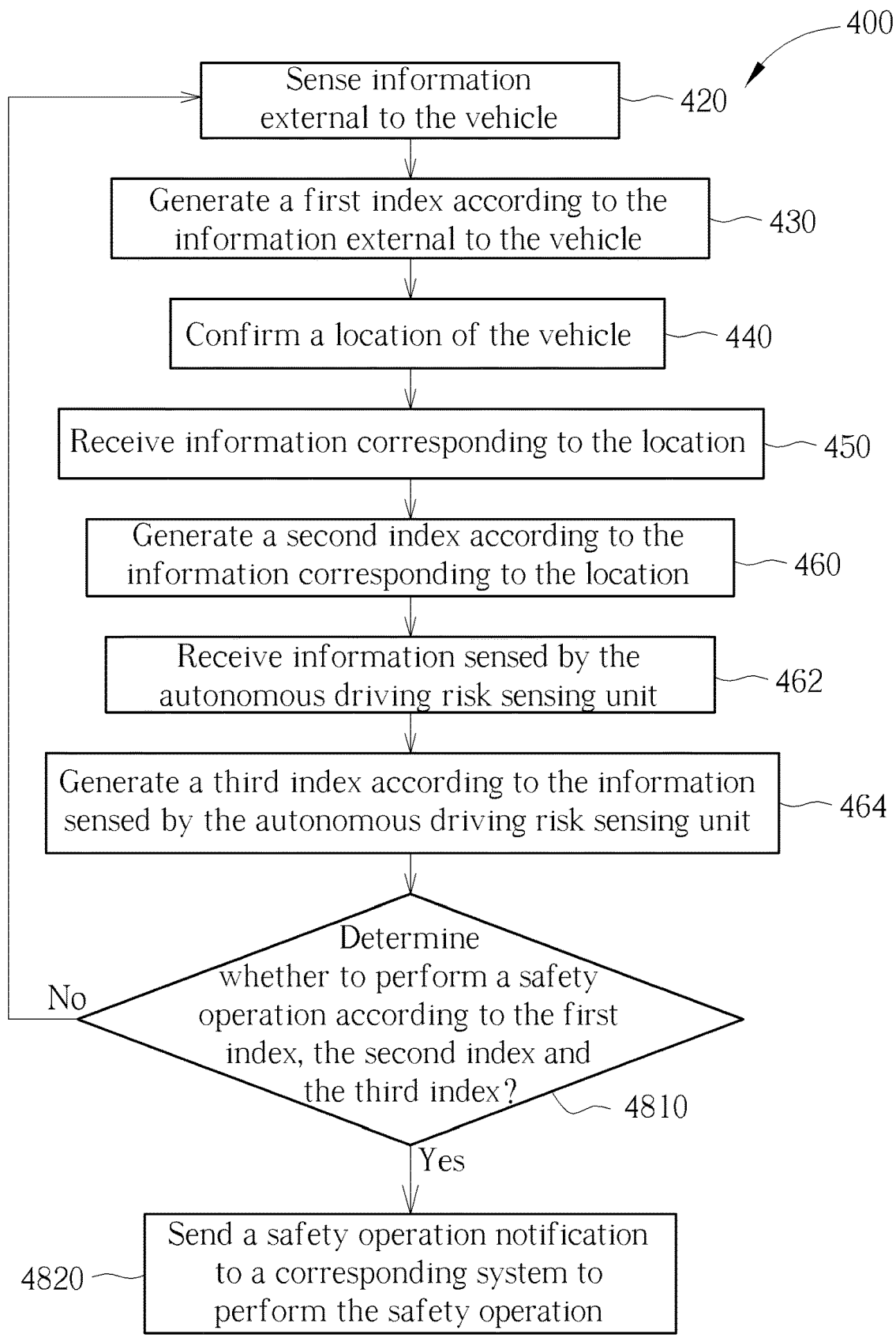
FIG. 5 illustrates a flowchart of a driving risk classification and prevention method according to an embodiment.

FIG. 5 illustrates a flowchart of a driving risk classification and prevention method 400 according to an embodiment. The method 400 may include following steps.

Step 420: sense information C1 external to the vehicle V1;

Step 430: generate a first index Pt1 according to the information C1 external to the vehicle V1;

Step 440: confirm a location P1 of the vehicle V1;

Step 450: receive information R1 corresponding to the location P1;

Step 460: generate a second index Pt2 according to the information R1 corresponding to the location P1;

Step 462: receive information D1 sensed by the autonomous driving risk sensing unit 125;

Step 464: generate a third index Pt3 according to the information D1 sensed by the autonomous driving risk sensing unit 125;

Step 4810: determine whether to perform a safety operation according to the first index Pt1, the second index Pt2 and the third index Pt3; if so, enter Step 4820; else, enter Step 420; and Step 4820: send a safety operation notification to a corresponding system to perform the safety operation.

The safety operation of Step 4820 may include heightening sensitivity of a sensor, turning on more sensors or reducing speed of the vehicle V1. The order of generating the first index Pt1, the second index Pt2 and the third index Pt3 may be adjusted. However, when the vehicle V1 is autonomously driven in the autonomous mode, Steps 462 and 464 may be preset to be necessary for improving the safety under the autonomous mode.

The safety operation may include switching the vehicle V1 to the autonomous mode from the non-autonomous mode, or switching the vehicle V1 to the non-autonomous mode from the autonomous mode. When the risk prevention unit 199 determines to perform the safety operation, the risk prevention unit 199 may select the type(s) of the safety operation. The safety operation may include switching the vehicle V1 to operate in the autonomous mode from the non-autonomous mode, switching the vehicle V1 to the non-autonomous mode from the autonomous mode, avoiding switching the vehicle V1 to the autonomous mode from the non-autonomous mode, reducing or limiting speed of the vehicle V1, adjusting a parameter of a sensor, disabling a sensor, enabling a sensor, sending a message (e.g. a vehicle-to-vehicle message or a help requesting message) via the communications unit 130, or other operations.

In summary, by means of the driving risk classification and prevention systems and methods provided by embodiments, a safety operation may be performed in advance to improve the driving safety, and the shortcomings of the conventional techniques in the field may be overcome.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driving risk classification and prevention system for a vehicle configurable to operate in an autonomous mode and a non-autonomous mode, the system comprising:

a global positioning system configured to determine a location of the vehicle;

at least one sensor configured to sense proximity traffic information;

an autonomous driving system;

an autonomous driving risk sensing unit including one or more sensors configured to sense one or more environmental parameters which are determined to interfere with autonomous driving of the vehicle;

a wireless transceiver configured to receive information from an external source; and a risk prevention unit comprising at least one processor and data storage comprising instructions executable by the at least one processor to:

generate a first index corresponding to a degree of risk according to the information sensed by the at least one sensor;

generate a second index corresponding to the degree of risk according to the information received by the wireless transceiver;

generate a third index corresponding to the degree of risk according to information sensed by the autonomous driving risk sensing unit;

determine an operation at least for disabling or enabling at least one sensor and adjusting one or more of a sensitivity, a sensing distance, and a sensing frequency of the at least one sensor is required according to at least one of the first index, the second index, and the third index; and in response to determining that the operation is required, send an operation notification and an automated driving notification to a corresponding system; and an automated driving unit comprising at least one processor used to autonomously drive the vehicle linked to the risk prevention unit automatedly driving the vehicle according to the automated driving notification, wherein the corresponding system is an external sensing unit.

2. The driving risk classification and prevention system of claim 1, wherein the operation further comprises avoiding initiating the autonomous mode when a driver engages the autonomous mode.

3. The driving risk classification and prevention system of claim 1, wherein the wireless transceiver is further configured to send driving information of the vehicle to the external sensing unit, the operation further comprises sending the driving information to the external sensing unit.

4. The driving risk classification and prevention system of claim 1, wherein the operation further comprises driving the vehicle.

5. The driving risk classification and prevention system of claim 1, further comprising:

an interior sensing unit configured to sense a driver status of a driver, and receive information from a wearable device worn by the driver;

wherein the risk prevention unit is further linked to the interior sensing unit, and the risk prevention unit is further configured to generate a fourth index according to information obtained by the interior sensing unit and determine whether to perform the safety operation further according to the fourth index.

6. The driving risk classification and prevention system of claim 5, wherein the interior sensing unit comprises an eyeball sensor, a heartbeat sensor, a breath sensor, a wearable sensor and/or a head motion sensor, and the driver status comprises an eyeball status, a heartbeat status, a breath status or a head motion status.

7. The driving risk classification and prevention system of claim 1, wherein the information sensed by the at least one sensor comprises at least one of car speed information, information of relative positions of the vehicle and at least one external object, information of relative speeds of the vehicle and at least one external object, and image information of the at least one external object.

8. The driving risk classification and prevention system of claim 1, wherein the information sensed by the automated driving risk sensing unit comprises a sunlight parameter, a sunlight reflection parameter, a fog parameter, a rain parameter, an atmospheric particulate matter parameter, or an insufficient lighting parameter.

9. The driving risk classification and prevention system of claim 1, wherein the information sensed by the automated driving risk sensing unit comprises risk classification of external vehicles based on a predetermined index of vehicle types.

10. The driving risk classification and prevention system of claim 1 further comprising a database configured to store information of the location of the vehicle wherein the communications unit is further linked to the database to receive the information of the location of the vehicle.

11. The driving risk classification and prevention system of claim 10 wherein the risk prevention unit is reconfigured through the communications unit.

12. The driving risk classification and prevention system of claim 1, wherein the information received by the communications unit comprises at least one of average car speed information, traffic flow information, road width information, road curvature information, road historic accident rate information, or weather information.

13. The driving risk classification and prevention system of claim 1 further comprising a memory linked to the risk prevention unit and configured to store data received or generated by the risk prevention unit.

14. An autonomous driving risk sensing system used for a vehicle having an autonomous driving system for a vehicle configurable to operate in an autonomous mode and a non-autonomous mode, comprising:
   an autonomous driving risk sensing unit including one or more sensors configured to sense information which are determined to interfere with autonomous driving of the vehicle;
   a global positioning system receiver configured to confirm a location of the vehicle;
   an exterior sensing unit comprising one or more of a camera sensor, a LiDAR sensor, and a radar sensor, the exterior sensing unit configured to sense information external to the vehicle;
   a wireless transceiver linked to the global positioning system receiver and configured to receive information corresponding to the location of the vehicle;
   a risk prevention unit linked to the global positioning system receiver, the exterior sensing unit, the autonomous driving risk sensing unit and the wireless transceiver, the risk prevention unit comprising at least a processor and a data storage device; and
   an automated driving unit comprising at least one processor used to autonomously drive the vehicle linked to the risk prevention unit automatedly driving the vehicle according to an operation notification,
   wherein the data storage device comprises instructions executable by the at least one processor so that the risk prevention unit is configured to generate a first index corresponding to a degree of risk according to the information sensed by the exterior sensing unit, generate a second index corresponding to the degree of risk according to the information received by the wireless transceiver, generate a third index corresponding to the degree of risk according to the information sensed by the autonomous driving risk sensing unit, determine whether to perform an operation at least for disabling or enabling at least one sensor and adjusting one or more of a sensitivity, a sensing distance, and a sensing frequency of the at least one sensor according to the first index, the second index and the third index, and send the operation notification to a corresponding system, the corresponding system performing the operation according to the operation notification,
   wherein the corresponding system is an external sensing unit.

15. The autonomous driving risk sensing system of claim 14, wherein the autonomous driving risk sensing unit comprises a light brightness sensor configured to monitor influence on image determination ability of a camera of the exterior sensing unit, wherein the influence is caused by light or sunlight external to the vehicle.

16. The autonomous driving risk sensing system of claim 15, wherein the autonomous driving risk sensing system is configured to predict influence of the sunlight on the vehicle when the vehicle is autonomously driven according to the location of the vehicle, a direction of the vehicle, time and/or weather information.

17. The autonomous driving risk sensing system of claim 14, wherein the information sensed by the autonomous driving risk sensing unit comprises information of atmospheric particulate matter which are determined to interfere with the autonomous driving of the vehicle, and the autonomous driving risk sensing unit is further configured to determine data which are determined to interfere with the autonomous driving of the vehicle according to the location of the vehicle and information of atmospheric particulate matter received by the communications unit.

18. The autonomous driving risk sensing system of claim 14, wherein the operation further comprises avoiding initiating the autonomous driving when a driver initiates the autonomous driving of the vehicle.

19. The autonomous driving risk sensing system of claim 14, wherein the wireless transceiver is further configured to send driving information of the vehicle to the external sensing unit, the operation further comprises sending the driving information to the external sensing unit.

20. A driving risk classification and prevention method for a vehicle configurable to operate in an autonomous mode or a non-autonomous mode, comprising:
   sensing information external to the vehicle;
   generating a first index corresponding to a degree of risk according to the information external to the vehicle;
   confirming a location of the vehicle;
   receiving information corresponding to the location;
   generating a second index corresponding to the degree of risk according to the information corresponding to the location;
   receiving one or more factors which are determined to interfere with autonomous driving of the vehicle;
   generating a third index corresponding to the degree of risk according to the one or more factors which are determined to interfere with the autonomous driving of the vehicle;
   determining whether to perform an operation at least for disabling or enabling at least one sensor and adjusting one or more of a sensitivity, a sensing distance, and a sensing frequency of the at least one sensor according to the first index, the second index, and the third index;

sending an operation notification to a corresponding system, the corresponding system automatedly driving the vehicle according to the operation notification, wherein the corresponding system is an external sensing unit.

21. The method of claim 20, further comprising:
sensing a driver status of a driver, information sent by a wearable device worn by the driver, and/or an interior space status of the vehicle;
generating a fourth index according to the driver status of the driver, the information sent by the wearable device worn by the driver, and/or the interior space status of the vehicle; and
determining whether to perform the safety operation according to the fourth index in addition to the first index and the second index.

22. The method of claim 21, wherein sensing the driver status comprises sensing an eyeball status, a heartbeat status, a breath status and/or a head motion status.

23. The method of claim 20, wherein the operation comprises avoiding initiating the autonomous driving when a driver initiates the autonomous driving of the vehicle.

24. The method of claim 20, wherein the external sensing unit includes one or more of a camera sensor, a LiDAR sensor, and a radar sensor.

25. The method of claim 20, wherein the operation further comprises sending driving information of the vehicle to an external system external to the vehicle.

26. The method of claim 20, wherein sensing the information external to the vehicle comprises sensing car speed information, information of relative positions of the vehicle and at least one external object, information of relative speeds of the vehicle and the at least one external object, or image information of the at least one external object.

27. The method of claim 20, wherein:
receiving the information corresponding to the location comprises receiving average car speed information, traffic flow information, road width information, road curvature information, road historic accident rate information, and/or weather information of the location; and
receiving the one or more factors which are determined to interfere with the autonomous driving of the vehicle comprises receiving a sunlight factor, a sunlight reflection factor, a fog factor, a rain factor, an atmospheric particulate matter factor, an insufficient lighting factor, or a factor which interferes the autonomous driving of the vehicle.

* * * * *